United States Patent

Bäro et al.

Patent Number: 5,368,075
Date of Patent: Nov. 29, 1994

[54] METALLIC SLEEVE FOR BRIDGING A LEAKAGE POINT ON A PIPE

[75] Inventors: Günter Bäro, Weinheim; Jakob Russ, Römerberg, both of Germany

[73] Assignee: ABB Reaktor GmbH, Mannheim, Germany

[21] Appl. No.: 717,987

[22] Filed: Jun. 20, 1991

[30] Foreign Application Priority Data

Jun. 20, 1990 [DE] Germany ............... 4019599

[51] Int. Cl.⁵ ........................... B22D 17/10
[52] U.S. Cl. ................... 138/98; 138/DIG. 6; 138/97
[58] Field of Search ......... 138/97, 98, 96 R, DIG. 6; 29/890.031, 890.051, 421.1, 421.2

[56] References Cited

U.S. PATENT DOCUMENTS

| | | | |
|---|---|---|---|
| 3,411,198 | 11/1968 | Berman et al. | 29/421.1 |
| 3,503,110 | 3/1970 | Berry et al. | 29/421.2 |
| 3,562,887 | 2/1971 | Schroeder et al. | 29/421.1 |
| 3,781,966 | 1/1974 | Lieberman | 138/DIG. 6 X |
| 4,941,512 | 7/1990 | McParland | 138/98 |

FOREIGN PATENT DOCUMENTS 611994  6/1979  Switzerland .

*Primary Examiner*—David A. Scherbel
*Assistant Examiner*—Patrick F. Brinson
*Attorney, Agent, or Firm*—Herbert L. Lerner; Laurence A. Greenberg

[57] ABSTRACT

A metallic sleeve for bridging a leakage point on a pipe has a predetermined wall thickness and requires relatively large expansion forces. In order to reduce springback after expansion has been completed, the sleeve is of multi-layer construction. The individual layers may be applied one after the other, and the wall thicknesses of all of the layers together correspond to the predetermined wall thickness of the metallic sleeve. The outer surface of each layer has a surface roughness with a profile depth of up to 0.1 mm and the surface hardness of the outer surfaces is greater than the surface hardness of the pipe and of the inner peripheral surfaces of the individual layers.

4 Claims, 2 Drawing Sheets

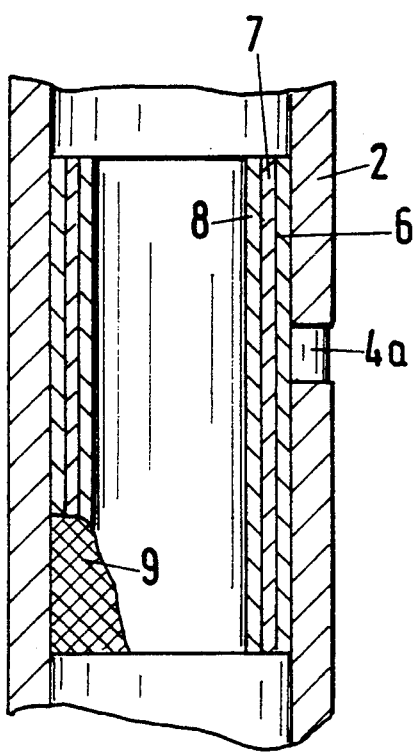
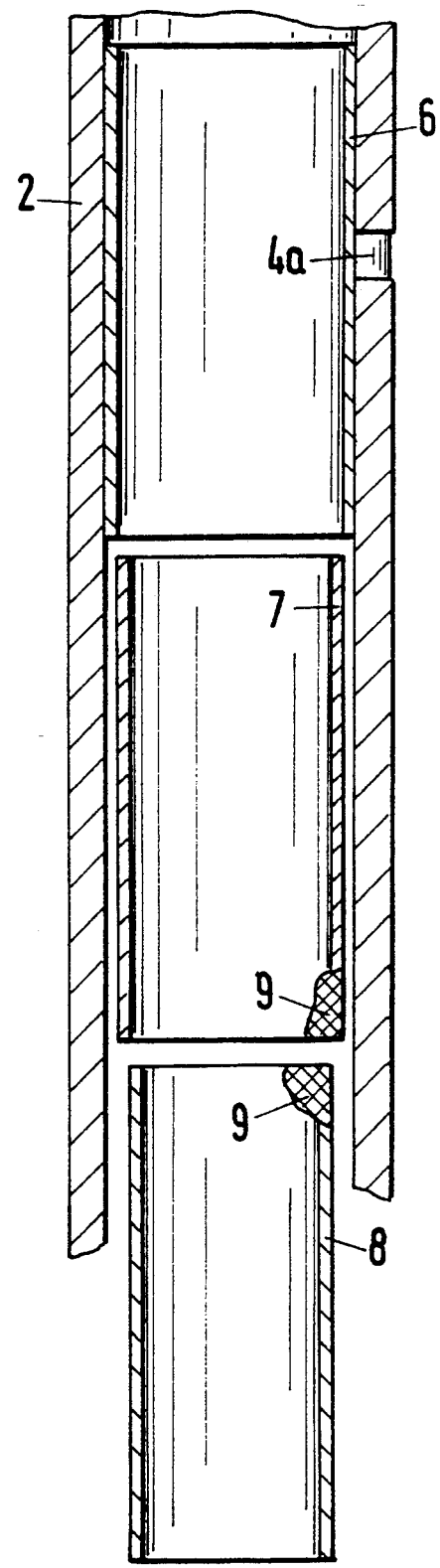

METALLIC SLEEVE FOR BRIDGING A LEAKAGE POINT ON A PIPE

The invention relates to a metallic sleeve with a predetermined wall thickness for bridging a leakage point on a pipe, wherein the metallic sleeve is to be placed on the inner wall surface of the pipe with the aid of an expansion technique.

Such a sleeve is known from Published European Application No. 00 47 407. In that publication, the sleeve has a partial region provided with toothing near its top and bottom ends. After the toothing has penetrated into the pipe wall in a first stage by hydraulic expansion of the regions, the region located between the toothings is likewise hydralically expanded in a second stage. A shrinking process thereby occurring in the axial direction is intended to reinforce the connection between the pipe and the sleeve in the region of the toothing. The metallic sleeve has a predeterminable wall thickness depending on the dimensions of the pipe. Due to the different elastic resilience of the deformed materials which depends, inter alia, on the different deformation paths of the pipe and the sleeve, a gap of approximately 5 to 10 μm occurs between the pipe and the sleeve during the expansion process. Therefore, small quantities of leakage have to tolerated. If the leakage is to be suppressed completely, was heretofore necessary to weld the sleeve ends to the pipe.

The welding constitutes a heat treatment which can lead to undesired stresses, and moreover increases the time spent on pipe repairs. Furthermore, the formation of corrosion in the gap cannot be ruled out.

It is accordingly an object of the invention to provide a metallic sleeve for bridging a leakage point on a pipe, which overcomes the hereinafore-mentioned disadvantages of the heretofore-known devices of this general type and which prevents the formation of a gap and thus allows a leakage-proof connection with the pipe without welding.

With the foregoing and other objects in view there is provided, in accordance with the invention, in a pipe having an inner wall surface and a leakage point, the improvement comprising a metallic sleeve with a predetermined or fixed wall thickness to be expanded onto the inner wall surface of the pipe for bridging the leakage point, the metallic sleeve including a multiplicity of individual layers to be applied one after the other, the layers having a combined wall thicknesses corresponding to the predetermined wall thickness of the metallic sleeve.

Since the bushes forming the individual layers have a thin-walled construction, a smaller effort is required during expansion, with the result that the formation of a gap is suppressed due to the lower resilience. The low loading has a particularly advantageous effect in the bridging of leakage points which occur in a pipe region located outside the tube sheet. The pipe can then compensate for the expansion forces of the individual layer despite the lack of support by the tube sheet.

In accordance with a concomitant feature of the invention, each of the layers has an outer surface and an inner peripheral surface, the outer surfaces having a surface roughness with a profile depth of up to 0.1 mm, and the outer surfaces having a surface hardness being greater than the surface hardness of the pipe and of the inner peripheral surfaces.

The surface roughness brings about an adequate form-locking connection. A form-locking connection is one which connects two elements together due to the shape of the elements themselves, as opposed to a force-locking connection, which locks the elements together by force external to the elements. However, the surface roughness is only slightly embedded in the softer parts, with the result that there it no weakening of the pipe wall or of the individual layers. Furthermore, the harder layers of the sandwich structure form a plurality of barriers against the formation of corrosion with the result that the service life of a leakage bridge having a metallic sleeve of multi-layer construction is considerably longer.

Other features which are considered as characteristic for the invention are set forth in the appended claims.

Although the invention is illustrated and described herein as embodied in a metallic sleeve for bridging a leakage point on a pipe, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 2 is an enlarged, partially broken-away view of a portion II of FIG. 1; and FIG. 3 is a fragmentary, partially broken-away, sectional view of a stepwise illustration of the application of individual layers.

Figure 1:
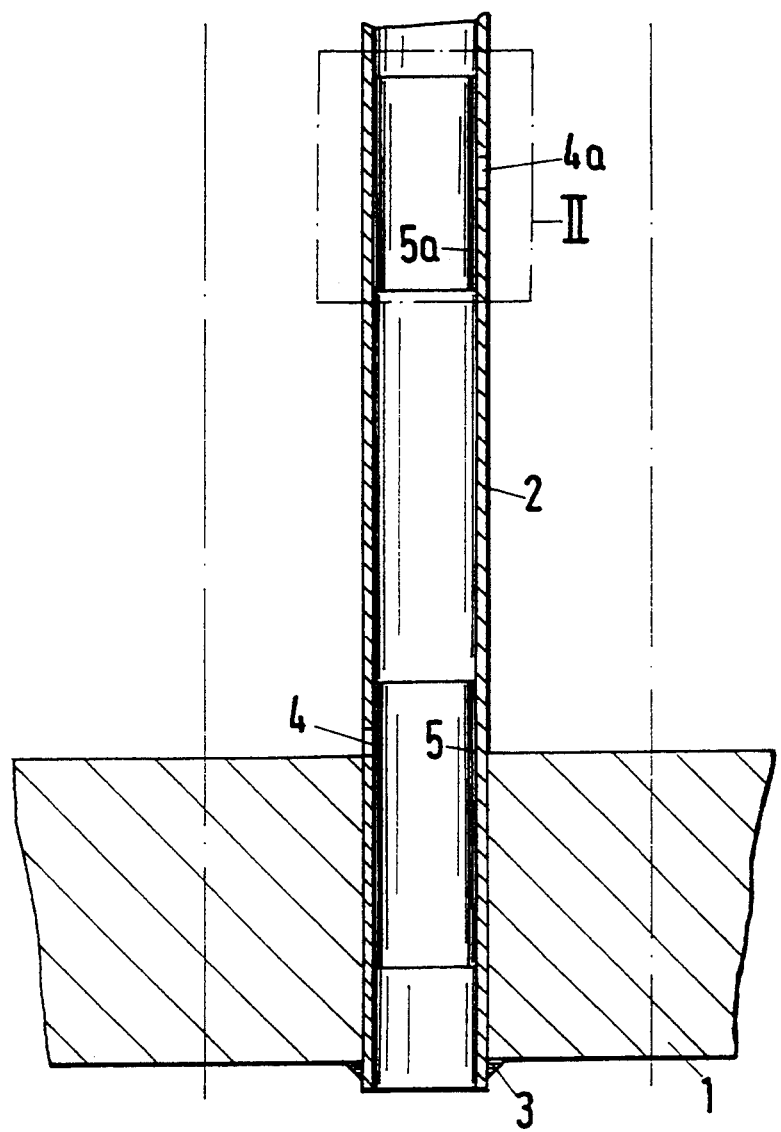
FIG. 1 is a fragmentary, diagrammatic, sectional view of a heat exchanger.

Referring now to the figures of the drawing in detail and first, particularly, to FIG. 1 thereof, there is seen a partial region of a tube sheet or pipe endplate 1 of a heat exchanger which is not illustrated in detail. A plurality of pipes or tubes 2 which end in the tube sheet are each secure by a weld 3. For reasons of simplified illustration, only one pipe 2 is illustrated. If the existence of leakage points 4, 4a is established during the examination of the heat exchanger pipes, a metallic sleeve 5, 5a is introduced into the heat exchanger pipe with the aid of a known expansion technique for bridging the leakage point. The wall thickness of the metallic sleeve is determined as a function of the pipe dimension, with the result that in a ⅞" pipe, for example, a sleeve wall thickness of 1.2 mm is prescribed. As shown in FIG. 2, in order to reduce the forces required for expanding the sleeve, the sleeve 5, 5a is formed of a plurality of layers 6, 7, 8 which have a wall thickness of 0.4 mm in the example indicated, and thus together have the predetermined wall thickness of the metallic sleeve 5, 5a of 1.2 mm.

The sequence of the application of the individual layers is explained with reference to FIG. 2. After a bush illustrating the layer 6 has been brought into contact with the inner wall surface of the pipe 2 by means of a non-illustrated expansion device, a bush forming the layer 7 is pushed into the layer 6 and brought into contact with the inner wall surface of the layer 6 using a non-illustrated expansion device. Finally, a bush forming the layer 8 is pushed into the layer 7, which has already been positioned, and brought into contact with the inner wall surface of the layer 7 by means of an expansion device. Prior to their expansion, there is only a small clearance between the individual layers of a maximum of 0.05 mm which is required for the pushing-in process in order to achieve an early contact during expansion. The outer surface of each layer is provided with a profiling 9, having a maximum profile depth of 0.1 mm. The outer surfaces have a greater surface hardness than the inner wall surface of the pipe or the inner peripheral surface of the respective layer. Due to the relatively small surface roughness together with the easy deformability of the individual layers, a positive connection of a layer to the tube 2 or of the individual layers to one another, is achieved.

We claim:

1. In a pipe having an inner wall surface and a leakage point, the improvement comprising a single metallic sleeve with a predetermined wall thickness to be expanded onto the inner wall surface of the pipe for bridging the leakage point, said metallic sleeve including a first layer to be expanded onto the inner wall surface of the pipe for sealing the leakage point, and a multiplicity of individual further layers to be applied one after the other, said layers having a combined wall thickness corresponding to said predetermined wall thickness of said metallic sleeve.

2. Metallic sleeve according to claim 1, wherein each of said layers has an outer surface and an inner peripheral surface, said outer surfaces having a surface roughness with a profile depth of up to 0.1 mm, and said outer surfaces having a surface hardness being greater than the surface hardness of the pipe and of said inner peripheral surfaces.

3. A metallic sleeve with a predetermined wall thickness expanded onto an inner wall surface of a pipe for bridging a leakage point on the pipe, the metallic sleeve comprising a first layer expanded onto an inner wall surface of a pipe for sealing a leakage point on the pipe, and a multiplicity of individual further layers sequentially placed inside each other and expanded in the pipe, said layers having a combined wall thickness corresponding to a predetermined wall thickness of the metallic sleeve.

4. Method for bridging a leakage point on a pipe with a metallic sleeve having a predetermined wall thickness, which comprises placing a first layer of the metallic sleeve into a pipe, expanding the first layer into contact with an inner wall surface of the pipe for sealing the leakage point, placing a second layer of the metallic sleeve into the first layer, expanding the second layer into contact with an inner wall surface of the first layer, and optionally repeating the placing and expanding steps until all of the layers of the metallic sleeve reach the predetermined combined wall thickness.

* * * * *